United States Patent [19]

Williams et al.

[11] Patent Number: 5,781,145

[45] Date of Patent: Jul. 14, 1998

[54] MOTORCYCLE MOUNTED RADAR/LASER SPEED DETECTION COUNTERMEASURE DEVICE

[76] Inventors: Robert B. Williams, HC67, Box 697, Clayton, Id. 83227; Stanley Carter, 574 Apex La., Challis, Id. 83226

[21] Appl. No.: 632,095

[22] Filed: Apr. 15, 1996

[51] Int. Cl.[6] .................................................. G01S 7/40
[52] U.S. Cl. ........................... 342/20; 342/54; 342/175; 455/227
[58] Field of Search .......................... 342/20, 175, 54; 455/226.2, 227, 228, 568; 2/6.1, 6.6; 128/201.19; 345/8; 379/174, 430; D2/865, 866

[56] References Cited

U.S. PATENT DOCUMENTS

| | | | |
|---|---|---|---|
| D. 262,196 | 12/1981 | Kumpfbeck | D10/104 |
| 4,706,195 | 11/1987 | Yoshino et al. | 364/426 |
| 4,719,462 | 1/1988 | Hawkins | 342/20 |
| 4,725,840 | 2/1988 | Orazietti | 342/20 |
| 5,005,661 | 4/1991 | Taylor et al. | 180/219 |
| 5,034,747 | 7/1991 | Donahue | 342/20 |
| 5,114,060 | 5/1992 | Boyer | 224/32 R |
| 5,420,828 | 5/1995 | Geiger | 367/131 |
| 5,525,989 | 6/1996 | Holt | 342/20 |
| 5,684,488 | 11/1997 | Liautaud et al. | 342/20 |

*Primary Examiner*—John B. Sotomayor
*Attorney, Agent, or Firm*—David L. Volk

[57] ABSTRACT

A radar/laser speed detection countermeasure device for use on a motorcycle is disclosed which detects and annunciates radar and/or laser based speed detection devices in use in the immediate physical area for the purposes of speed limit law enforcement. The device consists of a main detector body mounted in an interior cavity of a motorcycle, which is electrically connected to a remote mounted sensing head unit and a remote mounted indication and control panel. Hidden components and interconnecting wiring reduce the chance of theft and preserve the appearance of customized motorcycles.

3 Claims, 2 Drawing Sheets

MOTORCYCLE MOUNTED RADAR/LASER SPEED DETECTION COUNTERMEASURE DEVICE

BACKGROUND OF THE INVENTION

1. Field of the Invention

The present invention relates generally to radar and laser speed detection countermeasure units and, more particularly, to a radar and laser speed detection countermeasure device for customized mounting upon a motorcycle.

2. Description of the Related Art

In the related art, many methods of warning the driver of a vehicle of the presence of speed detecting radar are known. For example, in U.S. Pat. No. 4,719,462, issued in the name of Hawkins, a radar detection helmet is disclosed which can be worn by a motorcycle driver. Similarly, in U.S. Pat. No. 5,034,747, issued in the name of Donahue, a detachable radar unit for a helmet is disclosed. Additionally, in U.S. Pat. No. 5,114,060, issued in the name of Boyer, a radar detector mounting apparatus is disclosed for securely mounting a compact, commercially available radar detector unit on either the handlebars or fairing of a motorcycle.

Also, in U.S. Pat. No. 5,005,661, issued in the name of Taylor et al., a motorcycle mounting for radar is disclosed for mounting a radar speed monitor in a removable manner to a motorcycle.

Although these many improvements exist, the problems unique with mounting a speed detection countermeasure device to a motorcycle in a manner that can both deter theft of such devices as well as provide usefulness at high ambient noise conditions remain unaddressed. Consequently, a need has been felt for providing an apparatus and method for delivering solutions to these unique problems.

SUMMARY OF THE INVENTION

It is therefore an object of the present invention to provide an improved radar/laser speed detection countermeasure device for use on motorcycles.

It is another object of the present invention to provide an improved radar/laser speed detection countermeasure device that provides improved warning to riders of motorcycles due to high ambient noise conditions.

It is a feature of the present invention to provide an improved radar/laser speed detection countermeasure device that is not subject to easy theft from a motorcycle.

Briefly described according to one embodiment of the present invention, a radar/laser speed detection countermeasure device for use on a motorcycle is disclosed which detects and annunciates radar and/or laser based speed detection devices in use in the immediate physical area for the purposes of speed limit law enforcement.

Consisting of a main detector body mounted in an interior cavity of a motorcycle, it is electrically connected to a remote mounted sensing head unit and a remote mounted indication and control panel. Hidden components and interconnecting wiring reduce the chance of theft and preserve the appearance of customized motorcycles An advantage of the present invention is that it is in an operating state whenever the motorcycle is operating, thereby preventing inadvertent inactivation.

Another advantage of the present invention is that it is readily adaptable for all types of motorcycles and all types of mounting arrangements, including those of custom motorcycles.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

1. Detailed Description of the Figures

Figure 1:
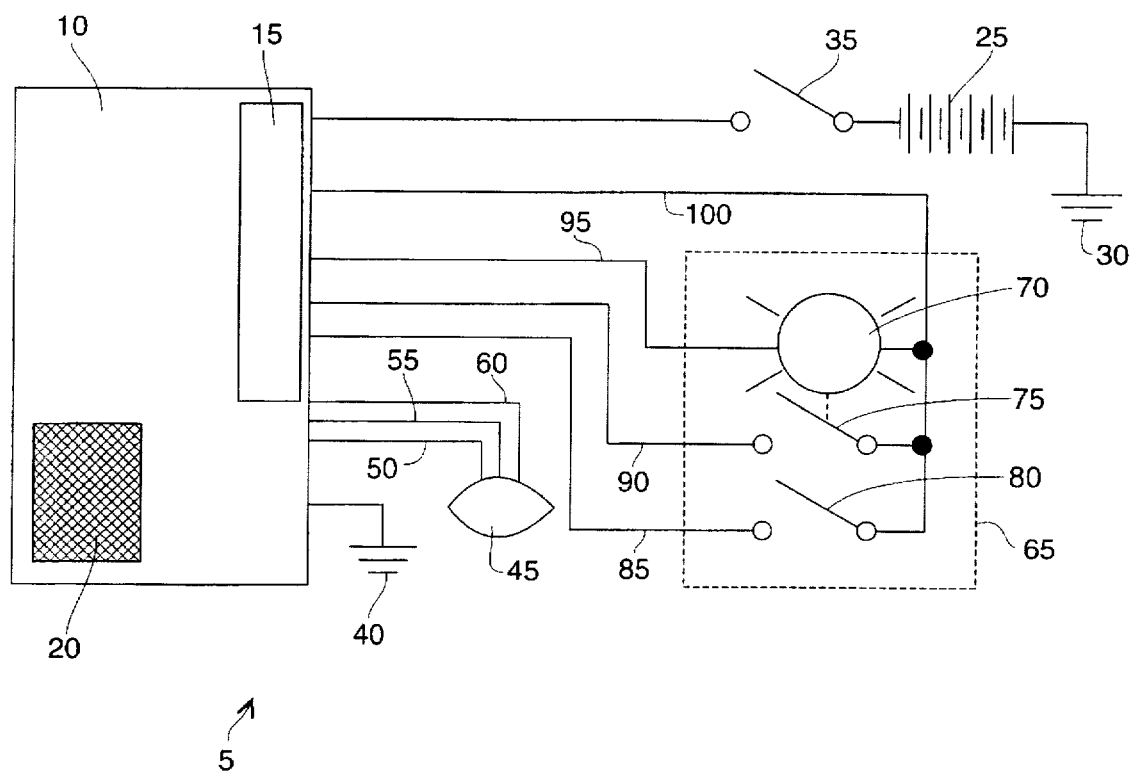
FIG. 1 is an electrical block diagram of the control circuit for use with a preferred embodiment of the present invention.

Referring now to FIG. 1, an electrical block diagram of a motorcycle mounted radar/laser speed detection countermeasure device 5 is disclosed. A main radar/laser detector body 10 is provided and used for the analysis of all incoming electrical signals. A wire and cable termination means 15 is attached mechanically and electrically to the main radar/laser detector body 10 for use in collection of all incoming electrical signals. It is intended that the wire and cable termination means 15 consists of a plurality of plug and receptacle connectors for the various electrical signals to be described later, however, it can be easily seen by those familiar in the art, that other means such as a terminal strip could be used also. Also, present on the main radar/laser detector body 10 is a speaker 20. The speaker 20 is used for direct audible annunciation of warning signals to alert the driver of the motorcycle (not shown) that law enforcement radar and/or laser based speed detection devices are being utilized in the immediate physical area. Providing electrical power to the motorcycle mounted radar/laser speed detection countermeasure device 5 is a motorcycle battery 25. This motorcycle battery 25 is the same typical battery used on a motorcycle for starting, voltage stability and other purposes. The motorcycle battery 25 is connected as usual to ground potential by a first ground connection 30. Positive power from the motorcycle battery 25 is controlled by a motorcycle key switch 35. This motorcycle key switch 35 is the same switch that is used to start and stop the motorcycle engine. It is intended that the wiring of main power to the motorcycle mounted radar/laser speed detection countermeasure device 5 in this manner will allow the motorcycle mounted radar/laser speed detection countermeasure device 5 to be activated whenever the motorcycle is running, thus preventing inadvertent inactivation of the motorcycle mounted radar/laser speed detection countermeasure device 5. Return power flow from the motorcycle mounted radar/laser speed detection countermeasure device 5 is provided by a second ground connection 40. A remote head detection unit 45 is provided for mounting on the front of the motorcycle as will be shown in greater detail later. The remote head detection unit 45 is used for the direct detection of the radar and laser beams and subsequent conversion into electrical signals. The remote head detection unit 45 will contain microwave sensing cavities and laser detection diodes as used presently by other conventionally available radar/laser detectors. A positive power signal 50 and a common negative power signal 55 are used to provide a power and return path between the main radar/laser detector body 10 and the remote head detection unit 45. A detection alert return signal 60 is used to provide indication to the main radar/laser detector body 10 that a radar and/or laser beam has been detected. It is intended that the positive power signal 50, the common negative power signal 55, and the detection alert return signal 60 are enclosed in a common cable of sufficient length to connect the main radar/laser detector body 10 and the remote head detection unit 45 together. A remote indication and control module 65 (indicated by dashed line) is remotely mounted on the motorcycle dash area as will be shown later in greater detail. The remote indication and control module 65 will be fabricated in an ornamental fashion with bezel covers and custom trim mounting rings to match existing motorcycle controls. A flashing indicator light 70 is provided for the direct visual annunciation of warning signals to alert the driver of the motorcycle (not shown) that law enforcement radar and/or laser based speed detection devices are being utilized in the immediate physical area. It is intended that the flashing indicator light 70 be of sufficient brightness and intensity that it can easily be seen even in direct sunlight. Connected physically to the flashing indicator light 70 is an on/off volume switch 75 which will allow the driver to turn off the audible annunciation of the speaker 20 as described earlier. The linkage between the flashing indicator light 70 and the on/off volume switch 75 allows the driver to simply push once upon the face cover of the flashing indicator light 70 to activate the on/off volume switch 75 and push it again to deactivate it. Also provided within the remote indication and control module 65 is a highway/city switch 80 for use in desensitizing the motorcycle mounted radar/laser speed detection countermeasure device 5 when traveling in urban areas to reduce the level of false alarms. Four wires consisting of a highway/city signal 85, an on/off volume switch 90, a visual annunciation signal 95 and a common path signal 100 are used to electrically connect the remote indication and control module 65 to the main radar/laser detector body 10. It is intended that the highway/city signal 85, the on/off volume switch 90, the visual annunciation signal 95, and the common path signal 100 are enclosed in a common cable of sufficient length to connect the main radar/laser detector body 10 and the remote indication and control module 65 together.

Figure 2:
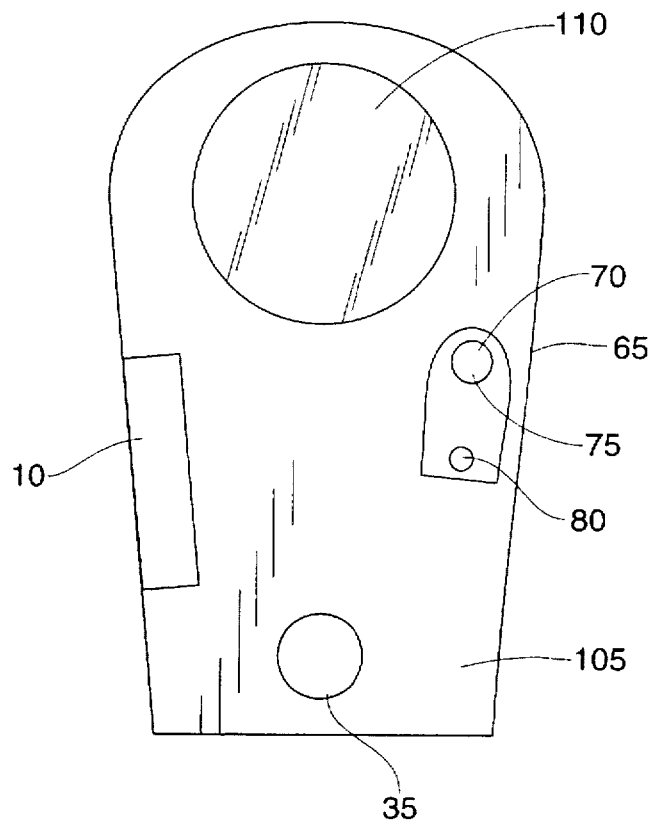
FIG. 2 is a pictorial diagram of the present invention shown in a utilized state upon a typical motor cycle.

Referring next to FIG. 2, a pictorial diagram of the present invention shown in a utilized state upon a typical motor cycle is disclosed. A motorcycle dash 105 with a speedometer 110 is disclosed as would be found on and part of a typical motorcycle. The motorcycle key switch 35 is also disclosed as would be found on a typical motorcycle. Mounted inside of the motorcycle dash 105 is the main radar/laser detector body 10. While shown mounted inside of the motorcycle dash 105, it can be seen by those familiar in the art that the main radar/laser detector body 10 could be mounted anywhere on the motorcycle including inside faring or other compartments. Also, mounted on the exterior of the motorcycle dash 105 is the remote indication and control module 65 with its flashing indicator light 70, on/off volume switch 75 and highway/city switch 80.

Figure 3:
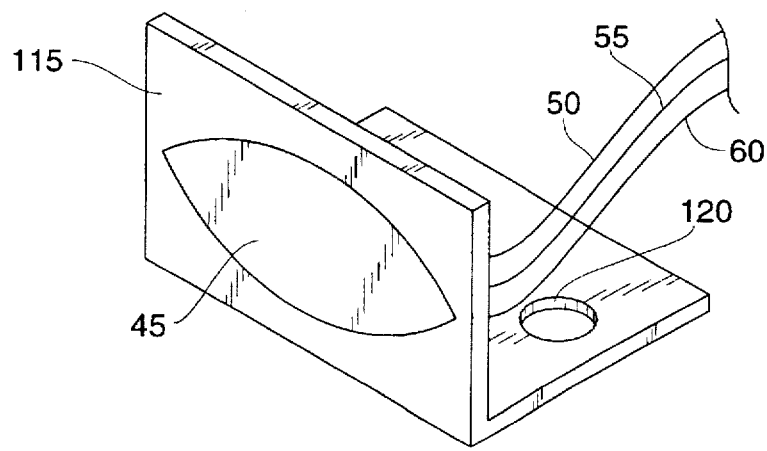
FIG. 3 is a pictorial illustration of a remote head detection unit as used with the present invention.

Referring finally to FIG. 3, a pictorial illustration of the remote head detection unit 45 as used with the present invention is disclosed. The remote head detection unit 45 as described earlier is mounted in firm mechanical contact upon a mounting bracket 115. A mounting hole 120 is provided for attaching the mounting bracket 115 to the motorcycle (not shown) in an inconspicuous manner. A wiring harness containing the positive power signal 50, the common negative power signal 55 and the detection alert return signal 60 is shown which connects to the main radar/laser detector body 10 (not shown in this figure).

2. Operation of the Preferred Embodiment

In operation, the present invention can be installed and utilized by the common user in a simple and effortless manner. To use the present invention with its preferred embodiment can best be described in conjunction with the electrical block diagram of the FIG. 1, the pictorial diagram of the present invention shown in a utilized state upon a typical motor cycle of FIG. 2, and the pictorial illustration of a remote head detection unit of FIG. 3.

An individual would begin by first installing the motorcycle mounted radar/laser speed detection countermeasure device 5 upon a typical motorcycle. The user would mount the remote head detection unit 45 with its mounting bracket 115 on the front of the motorcycle in an inconspicuous space, yet the space must have an unobstructed view of the road area ahead of the motorcycle. Next, the user would mount the remote indication and control module 65 in the dash area of the motorcycle and install the main radar/laser detector body 10 within the dash area or other interior space of the motorcycle as described earlier. Finally, all electrical connections between the main radar/laser detector body 10, the remote head detection unit 45, the remote indication and control module 65 and the motorcycle electrical system including connection to the motorcycle key switch 35 would be made.

At this point, the motorcycle mounted radar/laser speed detection countermeasure device 5 is ready for use. Whenever the motorcycle is running, power will be applied to the main radar/laser detector body 10 and monitoring for radar and/or laser speed detection signals will take place. Whenever such a signal is encountered, an audible warning will be produced via the speaker 20 provided the on/off volume switch 75 is in an enabled state, and a visual signal will be produced via the flashing indicator light 70. Further control over the sensitivity of the motorcycle mounted radar/laser speed detection countermeasure device 5 will be governed by the position of the on/off volume switch 75 which is controlled by the driver of the motorcycle. Whenever operation of the motorcycle is no longer desired, the driver simply turns off the motorcycle key switch 35 which also deactivates the motorcycle mounted radar/laser speed detection countermeasure device 5.

The foregoing description is included to illustrate the operation of the preferred embodiment and is not meant to limit the scope of the invention. The scope of the invention is to be limited only by the following claims.

What is claimed is:

1. A radar and laser detection device including:

a. a sensing means for detecting radar and laser speed detection beams;

b. an audible alarm means for providing an audible indication that a speed detection beam has been detected;

c. a visible alarm means for providing a visible indication that a speed detection beam has been detected; and d. a switch connected to a face cover of the visible alarm means, the switch configured to change a status of the audible alarm means between on and off each time the face cover is pushed.

2. A radar and laser detection device for use on a motorcycle including:

a. a sensing means for detecting radar and laser speed detection beams;

b. an audible alarm means for providing an audible indication that a speed detection beam has been detected;

c. a visible alarm means for providing a visible indication that a speed detection beam has been detected, the visible alarm means adapted to be mounted on a motorcycle dash; and d. a switch connected to a face cover of the visible alarm means, the switch configured to change a status of the audible alarm means between on and off each time the face cover is pushed.

3. A radar and laser detection device comprising:

a. a remote detection unit for detection of radar and laser speed detection beams;

b. the remote detection unit adapted for mounting on a front of a motorcycle;

c. a main body adapted for mounting inside of a motorcycle dash;

d. a remote indication and control module adapted to be mounted on a motorcycle dash;

e. the remote indication and control module comprising:

i. a flashing indicator light configured to provide a visible indication that a speed detection beam has been detected;

ii. a switch connected to a face cover of the flashing indicator light, the switch configured to change a status of a speaker between on and off each time the face cover is pushed;

iii. a highway/city switch configured to alter the sensitivity of the device depending on a location of the device;

f. the remote detection unit configured to send electrical signals to the main body;

g. the main body configured to receive and interpret the electrical signals and to send an alarm signal to the remote indication and control module when a speed detection beam has been detected; and h. the speaker mounted to the main body and configured to provide an audible indication that a speed detection beam has been detected.

* * * * *